US012624193B2

(12) United States Patent
Nakamura et al.

(10) Patent No.: US 12,624,193 B2
(45) Date of Patent: May 12, 2026

(54) BIODEGRADABLE RESIN COMPOSITION AND MOLDED PRODUCT

(71) Applicant: TBM CO., LTD., Tokyo (JP)

(72) Inventors: Hiroshi Nakamura, Tokyo (JP); Eiji Mizuno, Tokyo (JP); Gouki Sasakawa, Tokyo (JP)

(73) Assignee: TBM CO., LTD., Tokyo (JP)

( * ) Notice: Subject to any disclaimer, the term of this patent is extended or adjusted under 35 U.S.C. 154(b) by 390 days.

(21) Appl. No.: 17/794,315

(22) PCT Filed: Oct. 27, 2020

(86) PCT No.: PCT/JP2020/040308
§ 371 (c)(1),
(2) Date: Jul. 21, 2022

(87) PCT Pub. No.: WO2021/149318
PCT Pub. Date: Jul. 29, 2021

(65) Prior Publication Data
US 2023/0072685 A1 Mar. 9, 2023

(30) Foreign Application Priority Data
Jan. 24, 2020 (JP) ................................. 2020-010279

(51) Int. Cl.
*C08K 3/26* (2006.01)
*B29C 51/10* (2006.01)
*B29K 1/00* (2006.01)

(52) U.S. Cl.
CPC ................ *C08K 3/26* (2013.01); *B29C 51/10* (2013.01); *B29K 2001/12* (2013.01); *B29K 2995/006* (2013.01); *C08K 2003/265* (2013.01); *C08K 2201/003* (2013.01)

(58) Field of Classification Search
CPC ............... C08K 3/26; C08K 2003/265; C08K 2201/003; C08K 5/11; B29C 51/10; B29K 2001/12; B29K 2995/006; C08J 2300/16; C08J 2301/12; C08J 5/18; C08L 101/16; C08L 1/12
See application file for complete search history.

(56) References Cited

U.S. PATENT DOCUMENTS

2003/0079654 A1 5/2003 Tokiwa et al.
2010/0035045 A1* 2/2010 McAmish ................ C08J 3/226
428/323

2016/0200835 A1* 7/2016 Kurabayashi ............. C08B 3/06
536/71
2020/0165451 A1 5/2020 Enokido et al.
2021/0277206 A1* 9/2021 Suzuki ..................... C08L 1/12

FOREIGN PATENT DOCUMENTS

| CN | 103890084 A | 6/2014 |
|---|---|---|
| CN | 105199510 A | 12/2015 |
| CN | 106243855 A | 12/2016 |
| CN | 108806827 A | 11/2018 |
| CN | 110520455 A | 11/2019 |
| EP | 4093815 A1 | 11/2022 |
| JP | H09216654 A | 8/1997 |
| JP | 2000072906 A | 3/2000 |
| JP | 2001039014 A | 2/2001 |
| JP | 2002069303 A | 3/2002 |
| JP | 2002523598 A | 7/2002 |
| JP | 2009156937 A | 7/2009 |
| JP | 2010196056 A | 9/2010 |
| JP | 2018024809 A | 2/2018 |
| KR | 20140095925 A * | 8/2014 |
| KR | 101461777 B1 | 11/2014 |
| WO | 2000012616 A1 | 3/2000 |
| WO | 2001042367 A1 | 6/2001 |
| WO | 2021150540 A1 | 7/2021 |

OTHER PUBLICATIONS

Bumiller, "A Preliminary Investigation Concerning the Effect of Particle Shape on Powder's Flow Properties," 2002, World Congress on Particle Technology, vol. 4, pp. 21-25. (Year: 2002).*
International Search Report for International Application No. PCT/JP2020/040308; Date of Mailing, Nov. 24, 2020.
EPO Extended European Search Report for corresponding EP Application No. 20914900.4; Dated Jan. 31, 2024; 7 pages.

* cited by examiner

*Primary Examiner* — Robert S Jones, Jr.
*Assistant Examiner* — Joshua Caleb Bledsoe
(74) *Attorney, Agent, or Firm* — CANTOR COLBURN LLP

(57) ABSTRACT

Provided is a biodegradable resin composition that exhibits excellent biodegradability even in a molded product having a large thickness, has excellent mechanical properties, and is economically advantageous, and a molded product using the same. The molded product is provided using an inorganic substance powder-containing biodegradable resin composition including: a biodegradable resin and an inorganic substance powder in a mass ratio of 10:90 to 70:30, in which the biodegradable resin is a cellulose acetate-based resin and the inorganic substance powder is heavy calcium carbonate.

20 Claims, No Drawings

BIODEGRADABLE RESIN COMPOSITION AND MOLDED PRODUCT

CROSS REFERENCE TO RELATED APPLICATIONS

This is the U.S. national stage of application No. PCT/JP2020/040308, filed on Oct. 27, 2020. Priority under 35 U.S.C. § 119 (a) and 35 U.S.C. § 365 (b) is claimed from Japanese Application No. 2020-010279, filed Jan. 24, 2020, the disclosure of which is also incorporated herein by reference.

FIELD

The present invention relates to a biodegradable resin composition and a molded product using the same. Specifically described, the present invention relates to a biodegradable resin composition and a molded product having excellent biodegradability under an environment and sufficient mechanical strength.

BACKGROUND

Biodegradable resins have attracted attention as environmentally friendly resins because the resins turn into substances that originally exist in nature due to actions such as hydrolysis under the environment and microbial metabolism, and are widely used and expected to be more widely used in the future.

Conventionally, a cellulose acetate-based resin has been known as the biodegradable resin. The cellulose acetate-based resin has long been used as a fiber and film material and has attracted attention again as the biodegradable resin because the cellulose acetate-based resin can be hydrolyzed in water at a pH of 2 to 10 to lower its molecular weight and eventually decompose into carbon dioxide and water. For example, Patent Literature 1 has disclosed a biodegradable press-through package made of a bottom material including a biodegradable resin substrate/a metal layer and/or an organometallic compound layer and a lid material including a substrate of a biodegradable resin and an inorganic filler/a metal layer and/or an organometallic compound layer and has described the substrate for the lid material including 100 parts by weight of cellulose acetate and 25 parts by weight of talc. Patent Literature 2 has disclosed a coated paper for inkjet recording made by applying the composition of a biodegradable resin including a white pigment onto the surface of a sheet product of a recovered paper material and/or a non-wood pulp material and has described a cellulose acetate-based resin together with a polyhydroxyvalerate-butyrate copolymer and the like as the biodegradable resin. Patent Literature 3 has described flak-like cellulose acetate having 20 pieces/mm² or less of bright spot foreign matters of 20 μm or more.

In order to enhance the biodegradability of these cellulose acetate-based resins, various formulations also have been studied. For example, Patent Literature 4 has disclosed a composition including a polysaccharide ester, starch, and a plasticizer. In Examples, a composition including 38 parts by mass of cellulose acetate, 25 parts by mass of starch, 14 parts by mass of a plasticizer, 10 parts by mass of calcium carbonate, and the like has been described. Patent Literature 5 has disclosed a biodegradable resin composition including a biodegradable resin and a mannan degradation product. In Examples, a resin composition including polylactic acid, talc as a crystal nucleating agent, and galacto-manno-oligosaccharide in a weight ratio of 50:40:10 has been described.

With respect to the spread of the products using the biodegradable resin, however, many problems still remain unsolved. For example, the cellulose acetate-based resin provides satisfactory biodegradability of molded products having a small thickness such as films. However, molded products having a large thickness require long period of time for biodegradation. In particular, the biodegradability is significantly inferior under a marine environment. Therefore, the cellulose acetate-based resin has a significant problem in practical use. In general, the biodegradable resins are expensive in price due to high production costs. This is also a significant problem in order to replace petrochemical-based plastics and to spread.

The inventions described in Patent Literatures 4 and 5 aim to solve these problems. The above-described problems, however, have not yet been solved. In the case where starch and other components are added to the biodegradable resin, biodegradability is enhanced but mechanical properties such as strength and elongation are frequently deteriorated. Therefore, from the viewpoint of practicality, the blending amount of starch relative to the amount of the resin is limited and thus cost reduction is not so much achieved. The same problem may occur in the formulation of mannan degradation products.

CITATION LIST

Patent Literature

Patent Literature 1: Japanese Patent Application Laid-open No. H9-216654

Patent Literature 2: Japanese Patent Application Laid-open No. 2001-39014

Patent Literature 3: Japanese Patent Application Laid-open No. 2010-196056

Patent Literature 4: Published Japanese Translation of PCT International Publication for Patent Application No. 2002-523598

Patent Literature 5: WO2001/42367 Pamphlet

SUMMARY

Technical Problem

The present invention has been made in view of the above actual situations. An object of the present invention is to provide a biodegradable resin composition that exhibits excellent biodegradability even in a molded product having a large thickness, has excellent mechanical properties, and is economically advantageous and a molded product using the same.

Solution to Problem

As a result of intensive study for solving the above-described problems, the inventors of the present invention have found that in biodegradable resin compositions in which an inorganic substance powder is blended in a biodegradable resin, a biodegradable resin composition using a cellulose acetate-based resin as the biodegradable resin and heavy calcium carbonate as the inorganic powder and including the biodegradable resin and the heavy calcium carbonate in a mass ratio of 10:90 to 70:30 is a resin composition that exhibits excellent biodegradability even in a molded product having a large thickness, has excellent mechanical properties, and is economically advantageous and thus the present invention has been attained.

In other words, the present invention solving the above-described problem includes an inorganic substance powder-containing biodegradable resin composition comprising: a biodegradable resin and an inorganic substance powder in a mass ratio of 10:90 to 70:30, in which the biodegradable resin is a cellulose acetate-based resin; and the inorganic substance powder is heavy calcium carbonate.

Although the present invention is not limited by any specific theory, the reason why the inorganic substance powder-containing biodegradable resin composition according to the present invention exhibits the effects is because heavy calcium carbonate particles, that is, calcium carbonate particles obtained by mechanically crushing and classifying a natural raw material including $CaCO_3$ such as limestone as a main component are used and the heavy calcium carbonate particles are blended in a proportion of 30% by mass or more relative to the entire composition. In a molded product molded by using such a biodegradable resin composition, a large number of fine voids around which both components do not adhere are formed or a large number of parts in which adhesion is significantly weak exist at the interface between the cellulose acetate-based resin serving as the biodegradable resin constituting a matrix and the heavy calcium carbonate particles because the heavy calcium carbonate particles have a shape such as an irregular shape originated from the production history of the heavy calcium carbonate particles and thus have a large specific surface area. It is conceivable that, in the resultant molded product, the surface area of the biodegradable resin becomes significantly high, the field of decomposition of the molded product due to the action of the enzyme is dramatically improved, or the efficiency of the biodegradability is improved by existence of the heavy calcium carbonate.

In one aspect of the biodegradable resin composition according to the present invention, the inorganic substance powder-containing biodegradable resin composition, in which a degree of acetylation of the cellulose acetate-based resin is 50% to 65% is represented.

In one aspect of the biodegradable resin composition according to the present invention, the inorganic substance powder-containing biodegradable resin composition, in which the inorganic substance powder is heavy calcium carbonate without surface treatment is represented.

In one aspect of the biodegradable resin composition according to the present invention, the inorganic substance powder-containing biodegradable resin composition, in which an average particle diameter calculated from a measurement result of a specific surface area of heavy calcium carbonate particles by an air permeation method in accordance with JIS M-8511 is 0.7 μm or more and 6.0 μm or less is represented.

In the present invention, a molded product including the inorganic substance powder-containing biodegradable resin composition is also represented.

In one aspect of the molded product according to the present invention, an injection molded product including the inorganic substance powder-containing biodegradable resin composition is represented.

In one aspect of the biodegradable resin composition according to the present invention, the inorganic substance powder-containing biodegradable resin composition used for vacuum molding is represented.

In the present invention, a sheet for vacuum molding made by extrusion molding the inorganic substance powder-containing biodegradable resin composition is also represented.

In one aspect of the biodegradable resin composition according to the present invention, the inorganic substance powder-containing biodegradable resin composition used for inflation molding is represented.

In the present invention, a film made by inflation molding the inorganic substance powder-containing biodegradable resin composition is also represented.

In the present invention, a molded product made by vacuum molding the sheet for vacuum molding is also represented.

Advantageous Effects of Invention

According to the present invention, a biodegradable resin composition and a molded product that exhibit excellent biodegradability even in a molded product having a large thickness, have excellent mechanical properties, and are economically advantageous can be provided.

DESCRIPTION OF EMBODIMENTS

Hereinafter, the present invention will be described in detail with reference to embodiments.
<<Biodegradable Resin Composition>>
The inorganic substance powder-containing biodegradable resin composition according to the present invention includes a biodegradable resin and an inorganic substance powder in a mass ratio of 10:90 to 70:30, in which the biodegradable resin is a cellulose acetate-based resin, and the inorganic substance powder is heavy calcium carbonate. Hereinafter, each component will be described in detail.
<Biodegradable Resin>
In the present invention, the cellulose acetate-based resin is used as the biodegradable resin. Here, the cellulose acetate-based resin includes all polymers having monomer units esterified with acetic acid. Cellulose acetate is usually produced by converting cellulose into acetate ester and thereafter hydrolyzing the resultant acetate ester. Common commercially available cellulose acetate-based resins are cellulose triacetate (triacetyl cellulose) and cellulose diacetate having a degree of acetylation of about 55% (degree of substitution: about 2.45). The cellulose acetate-based resins that can be used in the present invention, however, are not limited to these cellulose acetate-based resins. Acetate propionate and acetate butyrate, which contain monomer units esterified with propionic acid or butyric acid respectively in addition to acetic acid, can also be used. For example, use of acetate propionate allows hardness and tensile strength to be improved and use of acetate butyrate allows weatherability and dimensional stability to be improved. Phthalic acid residues and the like may be included in order to improve film moldability. A degree of polymerization or a molecular weight is not particularly limited. For example, the cellulose acetate-based resin having a viscosity average degree of polymerization of about 200 to about 600 and particularly about 300 to about 500, or a mass average molecular weight of about 1,000 to about 1,000,000 and particularly about 10,000 to about 100,000 can be used. In addition, the melting point of the cellulose acetate-based resin is about 230 to about 300° C. Any resin having any melting point can be used depending on the intended use and a molding method. For example, a resin having a melting point of about 230 to about 250° C. may be used to mold at relatively low temperature, a resin having a melting point of about 270 to about 300° C. may be used to prepare a heat-resistant molded product, or considering the balance between mold-ability and heat resistance, a resin having a melting point of about 250 to about 270° C. can be used. The cellulose acetate-based resins may also be used in combination.

As described above, the cellulose acetate-based resin that can be used in the present invention is not particularly limited and various types of resins may be used depending on the purpose. For example, a water-soluble monosubstitu-ent (degree of acetylation: about 30%) may be used, a cellulose diacetate having a degree of acetylation of about 50% or less can be used, or a cellulose triacetate having a degree of acetylation of 60% or more can be used. In general, the solubility of the cellulose acetate-based resin largely varies depending on the degree of acetylation and thus the cellulose acetate-based resin can be selected from various types of resins that are suitable for the intended use. Polymers including a plurality of monomer units having different degrees of substitution (degrees of acetylation) can also be used. The sequence or distribution state of each of these monomers is not particularly limited.

In the present invention, however, the cellulose acetate-based resin having a degree of acetylation of about 50% or more is preferably used. The cellulose acetate having a degree of acetylation of 50% or more generally has high water resistance and thus the molded products made of the inorganic substance powder-containing biodegradable resin composition according to the present invention can be used for various applications. The resin having a degree of acetylation of about 53% or more and particularly about 57% or more is more preferably used. The upper limit of the degree of acetylation is not particularly limited. Considering the ease of processing such as dyeing, the upper limit is preferably set to about 65% and particularly about 60/o. In general, use of the cellulose acetate-based resin having a degree of acetylation of about 53% to about 57% and particularly 55.0% to 59.5% is recommended in order to improve mechanical strength. Different from the use of the above-described cellulose acetate-based resin, cellulose tri-acetate having a high degree of acetylation is used and, for example, subjected to heat treatment at around 240° C. to increase the crystallinity, whereby mechanical properties and durability can be improved.

<Heavy Calcium Carbonate Particles>

In the inorganic substance powder-containing biodegrad-able resin composition according to the present invention, heavy calcium carbonate particles are blended as an inor-ganic substance powder together with the cellulose acetate-based resin as described above. The heavy calcium carbon-ate is a product obtained by mechanically crushing and processing natural calcium carbonate as described below, and is clearly distinguished from synthetic calcium carbon-ate produced by chemical precipitation reaction or the like.

In the present specification, heavy calcium carbonate refers to a product produced by crushing and classifying natural calcium carbonate such as calcite (for example, limestone, chalk, and marble), shell, and coral. Limestone serving as the raw material of heavy calcium carbonate is produced in abundance in Japan with a high degree of purity and can be remarkably economically obtained.

Either a wet method or a dry method may be selected as the method for crushing heavy calcium carbonate. The dry crashing without the steps such as the dehydration step and the drying step is advantageous from the economical view-point. A crusher is also not particularly limited. An impact crusher, a crusher using a crushing medium such as a ball mill, a roller mill, and the like can be used.

The classification may be classification performed by air classification, wet cyclone, decanter, and the like. Surface treatment may be performed in any step of before crushing, during crushing, before classification, and after classifica-tion.

The surface of heavy calcium carbonate may be previ-ously subjected to surface modification to enhance dispers-ibility or reactivity of the heavy calcium carbonate. Examples of the surface modification method include physi-cal methods such as plasma treatment and a method in which the surface is subjected to chemical surface treatment with a coupling agent or a surfactant. Examples of the coupling agent include a silane coupling agent and a titanium cou-pling agent. The surfactant may be any of anionic, cationic, nonionic, and amphoteric surfactants and examples thereof include higher fatty acids, higher fatty acid esters, higher fatty acid amides, and higher fatty acid salts.

In the preferable embodiment of the invention, however, heavy calcium carbonate not subjected to surface treatment using a chemical treatment agent, at least, heavy calcium carbonate not subjected to surface treatment using the fatty acid-based compound as described above is preferably used as the heavy calcium carbonate to be used. This is because use of the heavy calcium carbonate not subjected to the surface treatment as described above allows a cause of odor generated by thermally decomposing the surface treatment agent attached to the surface at the time of molding to be slightly eliminated.

In the present invention, the reason why heavy calcium carbonate is used as the inorganic substance powder blended in the cellulose acetate-based resin is because use of the heavy calcium carbonate (particles) allows the biodegrad-ability of the cellulose acetate-based resin to be promoted by forming a large number of fine voids without adhesion between the cellulose acetate-based resin the serving as the biodegradable resin to be the matrix and the heavy calcium carbonate particle surface and by eluting alkaline compo-nents from the heavy calcium carbonate when water is penetrated into the voids at such interfaces.

The heavy calcium carbonate particles are not particularly limited. The average particle diameter of the heavy calcium carbonate particles is preferably 0.7 μm or more and 6.0 μm or less, more preferably 1.0 μm or more and 5.0 μm or less, and further preferably 1.5 μm or more and 3.0 μm or less. The average particle diameter of the inorganic substance powder (heavy calcium carbonate particles) described in the present specification refers to a value calculated from the measurement result of the specific surface area by the air permeation method in accordance with JIS M-8511. As a measuring instrument, for example, a specific surface area measuring apparatus Type SS-100 manufactured by Shi-madzu Corporation can be preferably used. Although depending on the layer thickness of the molded product, the resin composition including the heavy calcium carbonate particles having an average particle diameter of more than 6.0 μm may cause, when a sheet-shaped molded product is molded using the composition, for example, the heavy calcium carbonate particles to be protruded from the surface of the molded product and thus the heavy calcium carbonate particles to fall off, or the surface properties, mechanical strength, or the like to be impaired. In particular, in the particle diameter distribution, particles having a particle diameter of 45 μm or more are preferably excluded. On the other hand, excessively fine particles cause the viscosity at the time of kneading with the above-described biodegradable resin to significantly increase and thus production of the molded products may be difficult. Therefore, the average particle diameter is preferably set to 0.7 μm or more.

Unlike light calcium carbonate produced by the synthetic method, for example, surface irregularity and large specific surface area due to the particle formation by the crushing process are particularly important for the heavy calcium carbonate particles used in the present invention. As described above, there is a state where a large number of fine voids around which the cellulose acetate-based resin does not adhere to the surface of the heavy calcium carbonate particles are formed or a state where a large number of parts in which adhesion is significantly weak exist immediately after molding the molded product at the interface of the cellulose acetate-based resin constituting the matrix and the heavy calcium carbonate particles even without applying treatment such as stretching in particular because the heavy calcium carbonate particles blended in the biodegradable resin composition have such an irregular shape and large specific surface area.

From this reason, the specific surface area of the heavy calcium carbonate particles is desirably 0.1 m$^2$/g or more and 10.0 m$^2$/g or less, more preferably 0.2 m$^2$/g or more and 5.0 m$^2$/g or less, and further preferably 1.0 m$^2$/g or more and 3.0 m$^2$/g or less. The BET adsorption method is described here in accordance with a nitrogen gas adsorption method. With respect to the molded product to be obtained, the heavy calcium carbonate particles having the specific surface area within this range allow the biodegradability under the natural environment to be excellently promoted because the cellulose acetate-based resin has many surfaces serving as the starting points of the biodegradation reaction from the reasons described above and thus, at the same time, deterioration in processability of the resin composition due to the blend of the heavy calcium carbonate particles to be reduced.

The irregularity of the heavy calcium carbonate particles can be represented by the low degree of spheroidization of the particle shape. Specifically, the roundness is desirably 0.50 or more and 0.95 or less, more preferably 0.55 or more and 0.93 or less, and further preferably 0.60 or more and 0.90 or less. When the heavy calcium carbonate particles used in the present invention have the roundness within such ranges, a state where a large number of fine voids without adhesion are formed or a state where a large number of parts where adhesion is very weak exist is likely to be formed at the interface between the cellulose acetate-based resin constituting the matrix and the heavy calcium carbonate particles. Therefore, the heavy calcium carbonate particles are suitable for enhancing biodegradability under the natural environment and, at the same time, provide excellent mechanical strength as the product and molding processability.

Here, the roundness can be represented by (Projected area of particle)/(Area of a circle having the same perimeter as the projected perimeter of particle). The method for measuring the roundness is not particularly limited. For example, the projected area of the particle and the projected perimeter of the particle are measured from a micrograph and determined to be (A) and (PM), respectively. When the radius of a circle having the same perimeter as the projected perimeter of the particle is determined to be (r), and the area of the circle having the same perimeter as the projected perimeter of the particle is determined to be (B), $$\text{Roundness} = A/B = A/\pi r^2 = A \times 4\pi/(PM)^2.$$

These measurements are performed with generally commercially available image analysis software using the projection image of each particle obtained by a scanning microscope, a stereomicroscope, or the like, whereby the roundness can be determined.

The heavy calcium carbonate particles included in the inorganic substance powder-containing biodegradable resin composition according to the present invention are preferably heavy calcium carbonate particles that include a composition partially including calcium oxide formed by partially oxidizing the particle surface of the heavy calcium carbonate particles in a state of the molded product. The degree of this oxidation is not particularly limited. Excessive oxidation is not necessary because the effect of promoting biodegradability can be observed even in a relatively small portion of the particle surface, for example, a proportion sufficiently smaller than 2% of the surface area of the particle. As the partial oxidation of the surface of the heavy calcium carbonate particles included in such a molded product, the heavy calcium carbonate particles used for molding are not required to be previously and separately subjected to heat treatment or the like. The heat history to which the heavy calcium carbonate particles are subjected when a molded product is produced by mixing and melting the above-described cellulose acetate-based resin and the heavy calcium carbonate particles may cause surface oxidation. The formation of calcium oxide by oxidation on the particle surface can be confirmed and quantified by, for example, the EDTA titration method, the potassium permanganate titration method, or the like specified in JIS R 9011: 2006.

The blend proportion (% by mass) of the above-described cellulose acetate-based resin and the heavy calcium carbonate particles included in the inorganic substance powder-containing biodegradable resin composition according to the present invention is not particularly limited as long as the proportion is 10:90 to 70:30. The proportion is preferably 20:80 to 60:40, more preferably 25:75 to 50:50, and particularly preferably 30:70 to 40:60. This is because, in the blend proportion of the cellulose acetate-based resin and heavy calcium carbonate particles, a proportion of the heavy calcium carbonate particles less than 30% by mass results in not obtaining the given physical properties such as texture and biodegradability of the molded product obtained by using the biodegradable resin composition due to blending the heavy calcium carbonate particles and having inferior economic efficiency, whereas a proportion of the heavy calcium carbonate particles more than 90% by mass causes molding processing by extrusion molding, injection molding, and the like to be difficult.

<Other Components>

In the inorganic substance powder-containing biodegradable resin composition according to the present invention, other thermoplastic resins may be blended, if necessary. So as not to substantially affect the biodegradability of the inorganic substance powder-containing biodegradable resin composition according to the present invention, the blending amount of other thermoplastic resins is preferably 20% by mass or less and more preferably 10% by mass or less relative to the total volume of the resin components. An aspect in which other thermoplastic resins are not blended is particularly preferable. Examples of the thermoplastic resin include polyolefin-based resins such as polyethylene-based resins, polypropylene-based resins, poly(methyl-1-pentene), and ethylene-cyclic olefin copolymers; functional group-containing polyolefin-based resins such as ethylene-vinyl acetate copolymers, ethylene-acrylic acid copolymers, ethylene-methacrylic acid copolymers, metal salts of ethylene-methacrylic acid copolymers (ionomers), ethylene-acrylic acid alkyl ester copolymers, ethylene-methacrylic acid alkyl ester copolymers, maleic acid-modified polyethylene, and maleic acid-modified polypropylene; polyamide-based resins such as nylon-6, nylon-6,6, nylon-6,10, and nylon-6,12; thermoplastic polyester resins such as aromatic polyester-based resins including polyethylene terephthalate and copolymers thereof, polyethylene naphthalate, and polybutylene terephthalate, and aliphatic polyester-based resins including polylactic acids such as poly(L-lactic acid), poly(D-lactic acid), and poly(DL-lactic acid), poly(3-hydroxybutyric acid), poly(3-hydroxyvaleric acid), poly(3-hydroxyhexanoic acid), poly(3-hydroxybutyrate-co-3-hydroxyhexanoate), poly(3-hydroxyoctanoic acid), poly(3-hydroxydecanoic acid), poly(4-hydroxybutyric acid), poly(4-hydroxyvaleric acid), and polybutylene succinate; polycarbonate resins such as aromatic polycarbonates and aliphatic polycarbonates; polystyrene-based resins such as atactic polystyrene, syndiotactic polystyrene, acrylonitrile-styrene (AS) copolymers, and acrylonitrile-butadiene-styrene (ABS) copolymers; polyvinyl chloride-based resins such as polyvinyl chloride and polyvinylidene chloride; polyphenylene sulfide; and polyether-based resins such as polyethersulphone, polyetherketone, and polyetheretherketone.

Other additives may be added as auxiliary agents to the inorganic substance powder-containing biodegradable resin composition according to the present invention, if necessary. As other additives, for example, plasticizers, fillers other than heavy calcium carbonate particles, colorants, lubricants, coupling agents, fluidity improvers, dispersing agents, antioxidants, ultraviolet ray absorbers, flame retardants, stabilizers, antistatic agents, foaming agents, carbohydrates such as starch, and the like may be blended. These additives may be used singly or in combination of two or more of them. These additives may be blended in the kneading step described below or may be previously blended in the biodegradable resin composition before the kneading step. In the inorganic substance powder-containing biodegradable resin composition according to the present invention, the amount of other additives to be added is not particularly limited as long as the desired effect of the blend of the above-described cellulose acetate-based resin and the heavy calcium carbonate particles is not impaired. For example, each of other additives is blended desirably in a proportion of about 0 to about 5% by mass and the total of other additives is blended in a proportion of 10% by mass or less in the case where the mass of the entire inorganic substance powder-containing biodegradable resin composition is determined to be 100%.

Hereinafter, among these other additives, the additives considered to be important will be described. However, the other additives are not limited thereto.

Examples of the plasticizers include triethyl citrate, acetyltriethyl citrate, dibutyl phthalate, diaryl phthalate, dimethyl phthalate, diethyl phthalate, di-2-methoxyethyl phthalate, dibutyl tartrate, o-benzoyl benzoate, diacetin, epoxidized soybean oil, as well as lactic acid, lactic acid oligomers having a weight average molecular weight of 3,000 or less, and branched polylactic acid (refer to, for example, WO2010/082639 Pamphlet). Cellulose acetate has poor thermoplasticity depending on its molecular structure and the use of plasticizers is recommended for heating molding. These plasticizers are usually blended at a proportion of 0.5 to 10 parts by mass, especially 1 to 5 parts by mass relative to 100 parts by mass of the cellulose acetate-based resin. The amount, however, is not limited to these ranges and epoxidized soybean oil or the like may be blended at a proportion of about 20 to about 50 parts by mass, depending on the purpose of the molded product.

As the fillers other than heavy calcium carbonate, for example, carbonates (except heavy calcium carbonate), sulfates, silicates, phosphates, borates, oxides of calcium, magnesium, aluminum, titanium, iron, zinc, or the like or hydrates of these filles may be added. Specific examples include light calcium carbonate, magnesium carbonate, zinc oxide, titanium oxide, silica, alumina, clay, talc, kaolin, aluminum hydroxide, magnesium hydroxide, aluminum silicate, magnesium silicate, calcium silicate, aluminum sulfate, magnesium sulfate, calcium sulfate, magnesium phosphate, barium sulfate, silica sand, carbon black, zeolite, molybdenum, diatomaceous earth, sericite, shirasu, calcium sulfite, sodium sulfate, potassium titanate, bentonite, wollastonite, and graphite. These fillers may be synthetic fillers or fillers originated from natural minerals.

As the colorants, any of the known organic pigments, inorganic pigments, and dyes can be used. Specific examples include organic pigments such as azo, anthraquinone, phthalocyanine, quinacridone, isoindolinone, dioxazine, perinone, quinophthalone, and perylene pigments, and inorganic pigments such as ultramarine blue, titanium oxide, titanium yellow, iron oxide (red iron oxide), chromium oxide, zinc white, and carbon black.

Examples of lubricants include fatty acid-based lubricants such as stearic acid, hydroxystearic acid, complex-type stearic acid, and oleic acid, aliphatic alcohol-based lubricants, aliphatic amide-based lubricants such as stearamide, oxystearamide, oleylamide, erucylamide, ricinolamide, behenamide, methylolamide, methylenebisstearamide, methylenebisstearobehenamide, bisamide acids of higher fatty acids, and complex-type amide, aliphatic ester-based lubricants such as n-butyl stearate, methyl hydroxystearate, polyvalent alcohol fatty acid esters, saturated fatty acid esters, and ester-based waxes, and fatty acid metal soap-based lubricants.

As the antioxidants, phosphorus-based antioxidants, phenol-based antioxidants, and pentaerythritol-based antioxidants can be used. More specifically, phosphorus-based antioxidants such as phosphorous acid esters and phosphoric acid esters are preferably used. Examples of the phosphorous acid esters include triesters, diesters, and monoesters of phosphorous acid such as triphenyl phosphite, tris(nonylphenyl) phosphite, and tris(2,4-di-t-butylphenyl) phosphite.

Examples of the phosphoric acid ester include trimethyl phosphate, triethyl phosphate, tributyl phosphate, trioctyl phosphate, triphenyl phosphate, tricresyl phosphate, tris (nonylphenyl) phosphate, and 2-ethylphenyl diphenyl phosphate. These phosphorus-based antioxidants may be used singly or in combination of two or more of the phosphorus-based antioxidants.

Examples of the phenol-based antioxidants include α-tocopherol, butylhydroxytoluene, sinapyl alcohol, vitamin E, n-octadecyl-3-(3,5-di-t-butyl-4-hydroxyphenyl) propionate, 2-t-butyl-6-(3'-t-butyl-5'-methyl-2'-hydroxybenzyl)-4-methylphenyl acrylate, 2,6-di-t-butyl-4-(N,N-dimethylaminomethyl)phenol, 3,5-di-t-butyl-4-hydroxybenzylphosphonate diethyl ester, and tetrakis[3-(3,5-di-t-butyl-4-hydroxyphenyl)propionyloxymethyl]methane. These phenol-based antioxidants can be used singly or in combination of two or more of the phenol-based antioxidants.

The flame retardants are not particularly limited. For example, halogen-based flame retardants, phosphorus-based flame retardants and non-phosphorus-halogen-based flame retardants such as metal hydrates can be used. Specific examples of the halogen-based flame retardants include halogenated bisphenylalkanes, halogenated bisphenol-based compounds such as halogenated bisphenylethers, halogenated bisphenylthioethers, and halogenated bisphenylsulfones, and bisphenol-bis(alkyl ether)-based compounds such as brominated bisphenol A, brominated bisphenol S, chlorinated bisphenol A, and chlorinated bisphenol S. Examples of the phosphorus-based flame retardants include tris(diethylphosphinic acid) aluminum, bisphenol A bis(diphenyl phosphate), triaryl isopropyl phosphate compounds, cresyl di-2,6-xylenyl phosphate, and condensed aromatic phosphoric acid esters. Examples of the metal hydrates include aluminum trihydrate, magnesium dihydroxide, and a combination thereof. These flame retardants can be used singly or in combination of two or more of the flame retardants. Furthermore, antimony oxides such as antimony trioxide and antimony pentoxide, zinc oxide, iron oxide, aluminum oxide, molybdenum oxide, titanium oxide, calcium oxide, and magnesium oxide can be used together as flame retardant aids.

The foaming agents are compounds that cause phase change from solid to gas or liquid to gas by mixing with or injecting with pressure into the biodegradable resin composition serving as the raw material in a melted state in a melting and kneading apparatus or gas itself, and are mainly used for controlling an expansion ratio (foaming density) of a foamed sheet. As the foaming agent dissolved in the biodegradable resin composition serving as the raw material, a foaming agent that is liquid at room temperature causes phase change into gas due to the resin temperature and the resultant gas is dissolved in the melted resin, and a foaming agent that is gas at room temperature is dissolved in the melted resin as it is without causing phase change. The foaming agent dispersed and dissolved in the melted resin expands inside the sheet because the pressure is released at the time of extruding the melted resin from the extrusion die into a sheet-like product to provide a foamed sheet by forming many fine closed cells inside the sheet. The foaming agent acts as a plasticizer that lowers the melt viscosity of the biodegradable resin composition serving as the raw material and lowers the temperature for achieving a plasticized state of the biodegradable resin composition serving as the raw material.

Examples of the foaming agent include aliphatic hydrocarbons such as propane, butane, pentane, hexane, and heptane; alicyclic hydrocarbons such as cyclobutane, cyclopentane, and cyclohexane; halogenated hydrocarbons such as chlorodifluoromethane, difluoromethane, trifluoromethane, trichlorofluoromethane, dichloromethane, dichlorofluoromethane, dichlorodifluoromethane, chloromethane, chloroethane, dichlorotrifluoroethane, dichloropentafluoroethane, tetrafluoroethane, difluoroethane, pentafluoroethane, trifluoroethane, dichlorotetrafluoroethane, trichlorotrifluoroethane, tetrachlorodifluoroethane, and perfluorocyclobutane; inorganic gases such as carbon dioxide, nitrogen, and air; and water.

The content of the foaming agent included in the foaming agent in the molding step can be appropriately determined depending on the amount and the like of the cellulose acetate-based resin and the heavy calcium carbonate particles, and is preferably in the range of 0.04 to 5.00% by mass relative to the total mass of the inorganic substance powder-containing biodegradable resin composition.

<<Molded Product>>

The molded product according to the present invention is a molded product molded by using the inorganic substance powder-containing biodegradable resin composition including the cellulose acetate-based resin blended with the heavy calcium carbonate particles described above.

The shape or the like of the molded product according to the present invention is not particularly limited and may be in various forms. Various molded products, for example, films, sheets, container products for food and other container products, or consumable products disposed in a relatively short period of time in the fields of daily necessities, automotive parts, electric/electronic parts, construction members, and the like may be molded.

The thickness of the molded product according to the present invention is also not particularly limited and may vary from a small thickness to a large thickness depending on the form of the molded product. For example, the molded product having a thickness of 10 sum to 5,000 μm and more preferably having a thickness of 30 μm to 2,000 μm is exemplified. The thickness within this range allows a molded product that has no problem of moldability and processability, does not cause thickness deviation, is uniform, and has no defect to be molded.

In the case where the form of the molded product is a sheet for vacuum molding, the thickness is desirably more preferably 300 μm to 2,000 μm, and further preferably 500 μm to 1,000 μm. A sheet having a thickness within such a range allows a secondary molded product having sufficient mechanical strength, excellent surface properties, and the like to be obtained in excellent processability even by the subsequent vacuum molding.

Furthermore, in the case where the form of the molded product is a film molded by inflation molding, the thickness is desirably more preferably 10 μm to 200 μm, and further preferably 30 μm to 100 μm. When a film having a thickness within such a range is molded, a molded product having sufficient mechanical strength and flexibility and also having excellent surface properties and the like can be molded.

In one aspect of the molded product according to the present invention, a member constituting the molded product may also be a product having a laminated structure. As described above, the molded product molded from the inorganic substance powder-containing biodegradable resin composition including the cellulose acetate-based resin blended with the heavy calcium carbonate particles has excellent mechanical strength, flexibility, heat resistance, biodegradability and the like. In order to provide various functionalities such as a non-migration property of the included components, scratch resistance, glossiness, and heat sealability to the surface, an aspect in which at least one surface of a layer made of the inorganic substance powder-containing biodegradable resin composition is covered with a surface layer may be employed. In the case where both surfaces of the layer including the inorganic substance powder-containing biodegradable resin composition are covered, the surface layers arranged on the respective surfaces may be the same or different. Another intermediate layer or a plurality of intermediate layers can be provided between the surface layer and the layer including the inorganic substance powder-containing biodegradable resin composition as described above. The material constituting such a surface layer is not particularly limited because various materials can be used depending on the function to be provided and the like. Examples thereof include an aspect of a biodegradable resin, in particular the cellulose acetate-based resin as described above and polylactic acid, having no additives or blending significantly low amounts of additives, or petroleum-based synthetic resins such as polyolefin resins, additive-free polypropylene film layers, and additive-free polyethylene film layers. The thickness of these surface layers may be sufficiently thin as compared with the thickness of the layer including the inorganic substance powder-containing biodegradable resin composition and, for example, about 1 μm to about 40 μm, and more preferably about 2 μm to about 15 μm. As described above, a method for covering at least one surface of the layer including the inorganic substance powder-containing biodegradable resin composition with the surface layer is also not particularly limited. As the method, a method in which a separately prepared film for the surface layer molded by, for example, inflation molding adheres to one surface or both surfaces of the layer including the inorganic substance powder-containing biodegradable resin composition by laminating processing, or a method in which, as conventionally known methods, the biodegradable composition for the surface layer is co-extruded using a two-color die or a multi-color die together with the inorganic substance powder-containing biodegradable resin composition according to the present invention to mold a laminated sheet can be employed.

<<Method for Producing Resin Molded Product>>

Common methods may be used as a method for producing the molded product obtained from the inorganic substance powder-containing biodegradable resin composition according to the present invention. For example, any known molding methods such as an injection molding method, a foam injection molding method, an injection compression molding method, an extrusion molding method, a blow molding method, an inflation molding method, a press molding method, a calendar molding method, a vacuum molding method, an in-mold molding method, a gas press molding method, a two-color or multi-color molding method, and a sandwich molding method may be employed. In the case where the inorganic substance powder-containing biodegradable resin composition according to the present invention includes the foaming agent and a molded product in an aspect of a foamed product is obtained, any conventionally known methods including liquid phase foaming such as injection foaming, extrusion foaming, and blow foaming, or solid phase foaming such as bead foaming, batch foaming, press foaming, and atmospheric secondary foaming may be employed as the method for molding the foamed product as long as the foamed molded product can be molded into a desired shape.

The inorganic substance powder-containing biodegradable resin composition according to the present invention is particularly suitable for, for example, injection molding, extrusion molding, and inflation molding. The inorganic substance powder-containing biodegradable resin composition according to the present invention is also suitable for vacuum molding. For example, extruded sheets can be vacuum molded to produce various types of molded products. The molding temperature cannot be specified in general because the molding temperature varies depending on the degree of acetylation of the cellulose acetate-based resin, the type and amount of comonomers, and the type and amount of the plasticizers. For example, molding is desirably performed at a melted resin temperature in the temperature range of 170 to 230° C. and more preferably 180 to 210° C. In such a temperature range, the cellulose acetate-based resin can be molded with excellent shape following property without deterioration.

As described above, in the molding of the molded product according to the present invention, molding of a multilayer product with other resin composition can be employed. Depending on the purpose, the other resin composition can be applied to one surface or both surfaces of the layer including the inorganic substance powder-containing biodegradable resin composition according to the present invention to mold a multilayer product, or conversely, the inorganic substance powder-containing biodegradable resin composition according to the present invention can be applied to one surface or both surfaces of the layer including the other resin composition to mold a multilayer product.

In the case of molding a sheet-like product or a film-like product, the product can be stretched in the uniaxial direction, the biaxial direction, or the multiaxial direction (stretching by, for example, an inflation method and a tubular method) at the time of or after the molding. Performing such stretching allows more voids to be formed between the heavy calcium carbonate particles and the cellulose acetate-based resin serving as the matrix in the sheet or film structure, which enhances the biodegradability of the molded product. In a non-stretched or substantially non-stretched aspect, the molded product according to the present invention can have sufficient mechanical strength and, at the same time, can provide excellent biodegradability.

The mixing of the cellulose acetate-based resin and the heavy calcium carbonate particles in the inorganic substance powder-containing biodegradable resin composition according to the present invention may be appropriately determined in accordance with the molding method (for example, extrusion molding, injection molding, and vacuum molding). For example, the cellulose acetate-based resin and the heavy calcium carbonate particles may be kneaded and melted before being charged into a molding machine from a hopper or the cellulose acetate-based resin and the heavy calcium carbonate particles may be kneaded and melted and, at the same time, molded. In melting and kneading, the heavy calcium carbonate particles are preferably uniformly dispersed in the cellulose acetate-based resin and, at the same time, the mixture is kneaded by applying high shear stress. For example, the mixture is preferably kneaded using a twin-screw kneader. Kneading can also be performed in the form of a slurry by dissolving the cellulose acetate-based resin in an appropriate solvent and adding the heavy calcium carbonate particles.

With respect to the production of the molded product according to the present invention, the inorganic substance powder-containing biodegradable resin composition made by blending the cellulose acetate-based resin and the heavy calcium carbonate particles in a predetermined proportion may or may not be in the form of pellets. In the case where the inorganic substance powder-containing biodegradable resin composition is in the form of pellets, the shape of the pellets is not particularly limited. For example, the pellets may be cylindrical, spherical, or ellipsoidal spherical shape, or other shapes. A pelletizing step for obtaining the pellets may be performed by procedures or apparatuses commonly used by those skilled in the art. For example, while the cellulose acetate-based resin is being melted using a twin-screw extruder or the like, the heavy calcium carbonate particles and other additives are charged and the resultant mixture is melted and kneaded, extruded into a strand shape, and cooled. Thereafter, the pellets may be produced using a pelletizer. The thus produced pellets can be used for injection molding or the like after sufficiently drying to remove water.

The size of the pellets may be appropriately determined depending on the shape. For example, in the case of the spherical pellets, the diameter may be 1 to 10 mm. In the case of the ellipsoidal spherical pellets, the pellets may have an elliptical shape with an aspect ratio of 0.1 to 1.0 and may have longitudinal and lateral lengths of 1 to 10 mm. In the case of cylindrical pellets, the diameter may be within a range of 1 to 10 mm and the length may be within a range of 1 to 10 mm.

EXAMPLES

The invention will be described more specifically with reference to Examples. The invention, however, is not limited to these Examples.
(Evaluation Methods)

Each physical property value described in the following Examples, Reference Examples, and Comparative Examples was evaluated by the following methods.
(BET Specific Surface Area)

The BET specific surface area was determined by a nitrogen gas adsorption method using BELSORP-mini manufactured by MicrotracBEL Corp.
(Average Particle Diameter)

The average particle diameter was calculated from the measurement result of a specific surface area by an air permeation method in accordance with JIS M-8511 using a specific surface area measuring apparatus Type SS-100 manufactured by Shimadzu Corporation.
(Roundness)

So as to represent the particle distribution of powder, 100 particles were sampled. The particle image of each of these particles obtained using an optical micrometer was subjected to image analysis using a commercially available image analysis software to determine the roundness. As a measurement principle, the projected area of the particle and the projected perimeter of the particle are measured and designated as (A) and (PM), respectively. When the radius of a circle having the same perimeter as the projected perimeter of the particle is designated as (r), $PM=2\pi r$ (1). When the area of the circle having the same perimeter as the projected perimeter of the particle is designated as (B), $B=\pi r^2$ (2). Transforming Formula (1) results in $r=PM/2\pi$ (3). Therefore, substituting Formula (3) into Formula (2) results in $B=\pi \times (PM/2\pi)^2$ (4). Therefore, the roundness is determined as $Roundness=A/B=A \times 4\pi/(PM)^2$.
(Tensile Strength and Elongation at Break)

The tensile test of the sheet was performed using Strograph manufactured by Toyo Seiki Seisaku-sho, Ltd. at a after, the state of the film or sheet was visually observed and evaluated according to the following evaluation criteria.
good: The film or sheet is decomposed.
fair: The film or sheet is partially decomposed.
bad: No change is observed in the film or sheet.
(Material)

Each component used in the following Examples and Comparative Examples was as follows.
Resin Component (P)
P1: Cellulose acetate, degree of acetylation 55%, 6% viscosity 70 mPa·s
P2: Cellulose acetate, degree of acetylation 61%, 6% viscosity 95 mPa·s
Calcium Carbonate (I)
I1: Heavy calcium carbonate particles, average particle diameter: 2.2 μm, BET specific surface area: 1.0 m²/g, roundness: 0.85, no surface treatment
I2: Heavy calcium carbonate particles, average particle diameter: 1.1 μm, BET specific surface area: 3.2 m²/g, roundness: 0.55, no surface treatment
I3: Heavy calcium carbonate particles, average particle diameter: 3.6 μm, BET Specific surface area: 0.6 m²/g, roundness: 0.90, no surface treatment
Ia: Light calcium carbonate particles, average particle diameter: 1.5 μm, BET specific surface area: 0.1 m²/g, roundness: 1.00

Examples 1 to 3 and Comparative Examples 1 and 2

Using 30 parts by mass of Resin P1, 70 parts by mass of each of the calcium carbonate particles, and 1 part by mass of triethyl citrate as a plasticizer, a film having a thickness of 30 μm was prepared using an inflation film extrusion line (circular die having a diameter of 60 mm, a die gap 1.2 mm, screw diameter 30 mm, I/D ratio=30). The film was treated with a BUR (Blow-Up Ratio) of 2.5. In the extruder, the temperature in each section was set to 180° C. to 200° C. and the rotation speed was maintained at 20 rpm. For comparison, the same operation was performed without using calcium carbonate to prepare a film (Comparative Example 1).

Table 1 lists the evaluation results of the tensile strength, elongation at break, and biodegradability of the obtained films.

TABLE 1

| | Comparative Example 1 | Example 1 | Example 2 | Example 3 | Comparative Example 2 |
|---|---|---|---|---|---|
| Calcium carbonate | None | I1 (Heavy) | I2 (Heavy) | I3 (Heavy) | Ia (Light) |
| Tensile strength (MPa) | 35.8 | 42.2 | 43.8 | 41.9 | 43.9 |
| Elongation at break (%) | 28 | 27 | 27 | 26 | 27 |
| Biodegradability | fair | good | good | good | fair | temperature of 23° C. As the shape of the test specimen, the dumbbell-shaped No. 3 test specimen in accordance with JIS K6251:2017 was used. The stretching speed was 200 mm/minute. The tensile modulus and the elongation at break were measured from the obtained stress-strain curve.
(Biodegradability)

The film or sheet (30 mm×30 mm) prepared in each of Examples and Comparative Examples was placed in a 25 ml vial together with 10 ml of seawater reserved at room temperature (25° C.±5° C.) and left for one month. There- As listed in Table 1, in Examples 1 to 3, in which the cellulose acetate resin and the heavy calcium carbonate were blended according to the present invention, films having excellent biodegradability and mechanical strength compared to cellulose acetate resin film without blending calcium carbonate (Comparative Example 1) were capable of being obtained. On the other hand, the film in Comparative Example 2, in which light calcium carbonate fine particles were blended, had excellent mechanical strength but had insufficient biodegradability.

Examples 4 to 6 and Comparative Examples 3 to 5

Cellulose acetate resin P2 and Heavy calcium carbonate I1 were used in the blending amounts listed in Table 2. The resultant mixture was molded into a sheet having a thickness of 500 μm by a twin-screw extruder at a temperature of 200° C. using a T-die. Thereafter, the sheet was further vacuum molded into a shallow dish-shaped container using a heating plate having a temperature of 300° C.

Table 2 lists the evaluation results of the tensile strength, elongation at break, and biodegradability of the obtained molded products.

TABLE 2

|  | Comparative Example 3 | Example 4 | Example 5 | Example 6 | Comparative Example 4 | Comparative Example 5 |
|---|---|---|---|---|---|---|
| Blending amount of P2 | 5 | 15 | 30 | 50 | 80 | 100 |
| Blending amount of I1 | 95 | 85 | 70 | 50 | 20 | 0 |
| Tensile strength (MPa) | # | 42.3 | 40.2 | 38.9 | 36.3 | 32.8 |
| Elongation at break (%) | # | 30 | 31 | 32 | 33 | 33 |
| Biodegradability | # | good | good | good | fair | bad |

* Unit: part by mass
Impossible to extrude

As listed in Table 2, in Examples 4 to 6, in which Cellulose acetate resin P2 and Heavy calcium carbonate I1 were blended in a mass ratio of 10:90 to 70:30 according to the present invention, molded products having both excellent biodegradability and mechanical properties were capable of being obtained. On the other hand, the molded products in Comparative Example 4, which had a low blend proportion of the calcium carbonate and Comparative Example 5, which included no calcium carbonate, exhibited insufficient biodegradability. In addition, in Comparative Example 3, in which the blend proportion of the calcium carbonate was extremely high, sheet molding by extrusion was impossible.

The invention claimed is:

1. An inorganic substance powder-containing biodegradable resin composition comprising: a biodegradable resin and an inorganic substance powder in a mass ratio of 10:90 to 70:30, wherein the biodegradable resin is a cellulose acetate-based resin, and the inorganic substance powder is heavy calcium carbonate, which is a product produced by crushing and classifying natural calcium carbonate, having a roundness of 0.50 to 0.95, and the inorganic substance powder-containing biodegradable resin composition does not contain a thermoplastic resin other than the cellulose acetate-based resin, wherein the inorganic substance powder-containing biodegradable resin composition does not comprise a plasticizer.

2. The inorganic substance powder-containing biodegradable resin composition according to claim 1, wherein a degree of acetylation of the cellulose acetate-based resin is 50% to 65%.

3. The inorganic substance powder-containing biodegradable resin composition according to claim 1, wherein the inorganic substance powder is heavy calcium carbonate without surface treatment.

4. The inorganic substance powder-containing biodegradable resin composition according to claim 1, wherein an average particle diameter calculated from a measurement result of a specific surface area of particles of the heavy calcium carbonate by an air permeation method in accordance with JIS M-8511 is 0.7 μm or more and 6.0 μm or less.

5. The inorganic substance powder-containing biodegradable resin composition according to claim 1, wherein the inorganic substance powder-containing biodegradable resin composition is used for vacuum molding.

6. The inorganic substance powder-containing biodegradable resin composition according to claim 1, wherein the inorganic substance powder-containing biodegradable resin composition is used for inflation molding.

7. A molded product comprising the inorganic substance powder-containing biodegradable resin composition according to claim 1.

8. A sheet for vacuum molding made by extrusion molding the inorganic substance powder-containing biodegradable resin composition according to claim 5.

9. A film made by inflation molding the inorganic substance powder-containing biodegradable resin composition according to claim 6.

10. A molded product made by vacuum molding the sheet for vacuum molding according to claim 8.

11. An injection-molded product comprising the inorganic substance powder-containing biodegradable resin composition according to claim 1.

12. The inorganic substance powder-containing biodegradable resin composition according to claim 2, wherein the inorganic substance powder is heavy calcium carbonate without surface treatment.

13. The inorganic substance powder-containing biodegradable resin composition according to claim 2, wherein an average particle diameter calculated from a measurement result of a specific surface area of particles of the heavy calcium carbonate by an air permeation method in accordance with JIS M-8511 is 0.7 μm or more and 6.0 μm or less.

14. An inorganic substance powder-containing biodegradable resin composition comprising: a biodegradable resin and an inorganic substance powder in a mass ratio of 10:90 to 70:30, wherein the biodegradable resin is a cellulose acetate-based resin, and the inorganic substance powder is heavy calcium carbonate, which is a product produced by crushing and classifying natural calcium carbonate, having a roundness of 0.50 to 0.95, and the inorganic substance powder-containing biodegradable resin composition does not contain polylactic acid and has a tensile strength of 38.9 to 43.8 MPa, wherein the inorganic substance powder-containing biodegradable resin composition does not comprise a plasticizer.

15. The inorganic substance powder-containing biodegradable resin composition according to claim 1, wherein the roundness of the heavy calcium carbonate is 0.50 to 0.55.

16. The inorganic substance powder-containing biodegradable resin composition according to claim 2, wherein the roundness of the heavy calcium carbonate is 0.50 to 0.55.

17. The inorganic substance powder-containing biodegradable resin composition according to claim 14, wherein the roundness of the heavy calcium carbonate is 0.50 to 0.55.

18. The inorganic substance powder-containing biodegradable resin composition according to claim 1, wherein the mass ratio of the biodegradable resin and the inorganic substance powder is 10:90 to 40:60.

19. The inorganic substance powder-containing biodegradable resin composition according to claim 2, wherein the mass ratio of the biodegradable resin and the inorganic substance powder is 10:90 to 40:60.

20. The inorganic substance powder-containing biodegradable resin composition according to claim 14, wherein the mass ratio of the biodegradable resin and the inorganic substance powder is 10:90 to 40:60.

\* \* \* \* \*